US008649110B2

(12) United States Patent
Kobayashi et al.

(10) Patent No.: US 8,649,110 B2
(45) Date of Patent: Feb. 11, 2014

(54) LENS BARREL

(71) Applicant: Panasonic Corporation, Osaka (JP)

(72) Inventors: Manabu Kobayashi, Osaka (JP); Atsushi Hasegawa, Osaka (JP); Toshiyuki Nakada, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/739,051

(22) Filed: Jan. 11, 2013

(65) Prior Publication Data

US 2013/0194680 A1 Aug. 1, 2013

(30) Foreign Application Priority Data

Jan. 13, 2012 (JP) .................................. 2012-005019

(51) Int. Cl.
  *G02B 15/14* (2006.01)
  *G03B 9/00* (2006.01)

(52) U.S. Cl.
  USPC ........... 359/700; 359/694; 359/699; 359/701; 396/144; 396/458; 396/497; 348/357

(58) Field of Classification Search
  USPC ........ 359/694–704, 823, 824; 396/72–79, 85, 396/89, 144, 147, 348, 448, 458, 497, 529, 396/532, 542; 348/208.4, 357, E5.028, 348/E5.031
  See application file for complete search history.

(56) References Cited

U.S. PATENT DOCUMENTS

| 5,793,537 | A | * | 8/1998 | Nomura et al. ................ 359/700 |
| 5,809,361 | A | * | 9/1998 | Nomura et al. ................ 396/542 |
| 5,826,126 | A | | 10/1998 | Nomura et al. |
| 5,991,097 | A | * | 11/1999 | Nomura et al. ................ 359/700 |
| 6,778,334 | B2 | * | 8/2004 | Nomura et al. ................ 359/701 |
| 6,799,906 | B2 | * | 10/2004 | Nomura et al. ................ 396/497 |
| 7,019,915 | B2 | * | 3/2006 | Sakamoto ..................... 359/695 |
| 7,035,019 | B2 | * | 4/2006 | Sakamoto ..................... 359/700 |
| 7,050,244 | B2 | * | 5/2006 | Hayashi et al. ................ 359/701 |
| 7,435,016 | B2 | * | 10/2008 | Nomura ........................ 396/348 |
| 7,751,126 | B2 | * | 7/2010 | Shirakata ...................... 359/701 |
| 8,351,775 | B2 | * | 1/2013 | Nagae ............................. 396/83 |
| 2002/0135900 | A1 | | 9/2002 | Nomura et al. |
| 2009/0040369 | A1 | | 2/2009 | Miyoshi |

FOREIGN PATENT DOCUMENTS

| JP | 09-222542 | 8/1997 |
| JP | 2002-277717 | 9/2002 |
| JP | 2007-219304 | 8/2007 |
| JP | 2009-042474 | 2/2009 |
| JP | 2011-203385 | 10/2011 |

* cited by examiner

*Primary Examiner* — Loha Ben
(74) *Attorney, Agent, or Firm* — Panasonic Patent Center

(57) ABSTRACT

A lens barrel includes a fixed frame, a rotary frame provided inside the fixed frame, a first frame provided inside the rotary frame, an electronic component provided inside the first frame, and a flexible printed circuit board connected, at one end thereof, to the electronic component and connected, at the other end thereof, to the fixed frame. A gear part is provided at an outer circumferential surface of the rotary frame. In the first frame, a first protrusion outwardly protruding beyond the gear part in a radial direction about the optical axis is provided at a position corresponding to the flexible printed circuit board in a circumferential direction about the optical axis on a side of the gear part opposite to the object in the optical axis direction.

3 Claims, 14 Drawing Sheets

LENS BARREL

CROSS-REFERENCE TO RELATED APPLICATION

This application claims priority to Japanese Patent Application No. 2012-005019 filed on Jan. 13, 2012, the entire disclosure of which is incorporated by reference herein.

BACKGROUND

Techniques disclosed herein relate to a lens barrel including a flexible printed circuit board.

Japanese Patent Publication No. 2007-219304 discloses a lens barrel configured to hold an optical system, a focal length of which is changeable. The lens barrel disclosed in Japanese Patent Publication No. 2007-219304 includes a frame body configured to hold a lens group. The frame body moves in an optical axis direction by a cam mechanism.

SUMMARY

A lens barrel includes electronic components such as a shutter. A flexible printed circuit board (FPC board) is connected to the electronic components, and, e.g., control signals are transmitted through the FPC board. In the lens barrel, a frame body configured to move upon zooming is provided. Since the FPC board can be freely deformed, the FPC board can follow movement of the frame body. However, there is a possibility that the FPC board comes into contact with the moving frame body due to the free deformation of the FPC board. In particular, it is more likely that such a disadvantage is caused for a smaller lens barrel.

The techniques disclosed herein reduces the possibility of damaging an FPC board due to contact with a member provided inside a lens barrel.

A lens barrel disclosed herein includes a fixed frame having an optical axis; a rotary frame provided inside the fixed frame and configured to rotate about the optical axis relative to the fixed frame; a first frame provided inside the rotary frame and configured to move in an optical axis direction in a state in which rotation of the first frame about the optical axis relative to the fixed frame is restricted; an electronic component provided inside the first frame and configured to move in the optical axis direction in a state in which rotation of the electronic component about the optical axis relative to the fixed frame is restricted; and a flexible printed circuit board connected, at one end thereof, to the electronic component so as to extend to the fixed frame by way of a side of the rotary frame opposite to an object in the optical axis direction, and connected, at the other end thereof, to the fixed frame. A gear part is provided at an outer circumferential surface of the rotary frame. In the first frame, a first protrusion outwardly protruding beyond the gear part in a radial direction about the optical axis is provided at a position corresponding to the flexible printed circuit board in a circumferential direction about the optical axis on a side of the gear part opposite to the object in the optical axis direction.

According to the foregoing lens barrel, the possibility of damaging the FPC board due to contact with the gear part can be reduced.

DETAILED DESCRIPTION

An example embodiment will be described below in detail with reference to drawings.

<1. Schematic Configuration>

Figure 1:
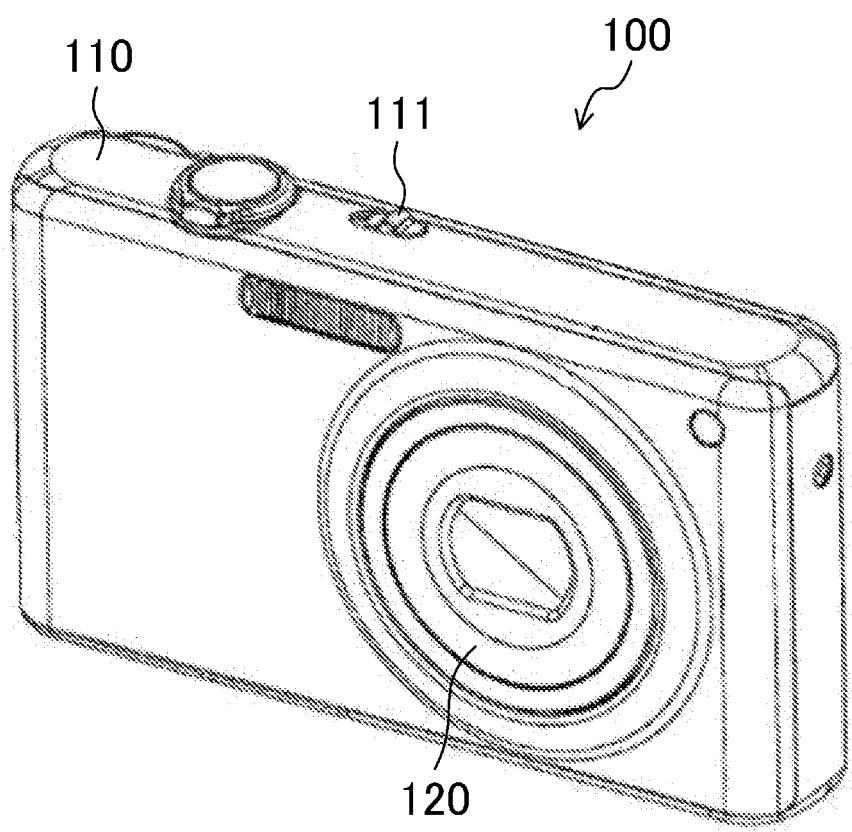
FIG. 1 is a perspective view of a digital camera.

FIG. 1 is a perspective view of a digital camera 100.

The digital camera 100 includes a camera body 110 and a lens barrel 120. The lens barrel 120 has an optical axis AX. The digital camera 100 is an example of an imaging apparatus. Note that the imaging apparatus may be a film camera or a camera from which a lens barrel is detachable. In addition, the imaging apparatus may not be a still camera, but a camcorder which can take moving pictures.

A side close to an object in an optical axis direction is referred to as "front" or "forward," and a side (i.e., a side opposite to the object) close to an imaging device in the optical axis direction is referred to as "back" or "backward." Moreover, an upper side in the vertical direction when the digital camera 100 is in a horizontal shooting attitude is referred to as an "upper side," and a lower side in the vertical direction is referred to as a "lower side." The "horizontal shooting attitude" means the state in which a long side of the imaging device is coincident with the horizontal direction and a short side of the imaging device is coincident with the vertical direction. A left side when the digital camera 100 which is in the horizontal shooting attitude is viewed from the side close to the object in the optical axis direction is referred to as a "left side," and a right side is referred to as a "right side."

"Rotation" simply means rotation about the optical axis AX. A "radial direction" and a "circumferential direction" mean a radial direction and a circumferential direction about the optical axis AX, respectively.

A power switch 111 is provided at an upper surface of the camera body 110. When power is off, the lens barrel 120 of the digital camera 100 is in a collapsed state as illustrated in FIG. 1. In the collapsed state, a plurality of frames described later are retracted, and the dimension of the lens barrel 120 in the optical axis direction is small. When power is on, the lens barrel 120 is extended, and the digital camera 100 is in a shooting state in which shooting is allowed. In the shooting state, the plurality of frames are extended, and the dimension of the lens barrel 120 in the optical axis direction is greater than that in the collapsed state.

<2-1. Outline of Configuration of Lens Barrel>

Figure 2:
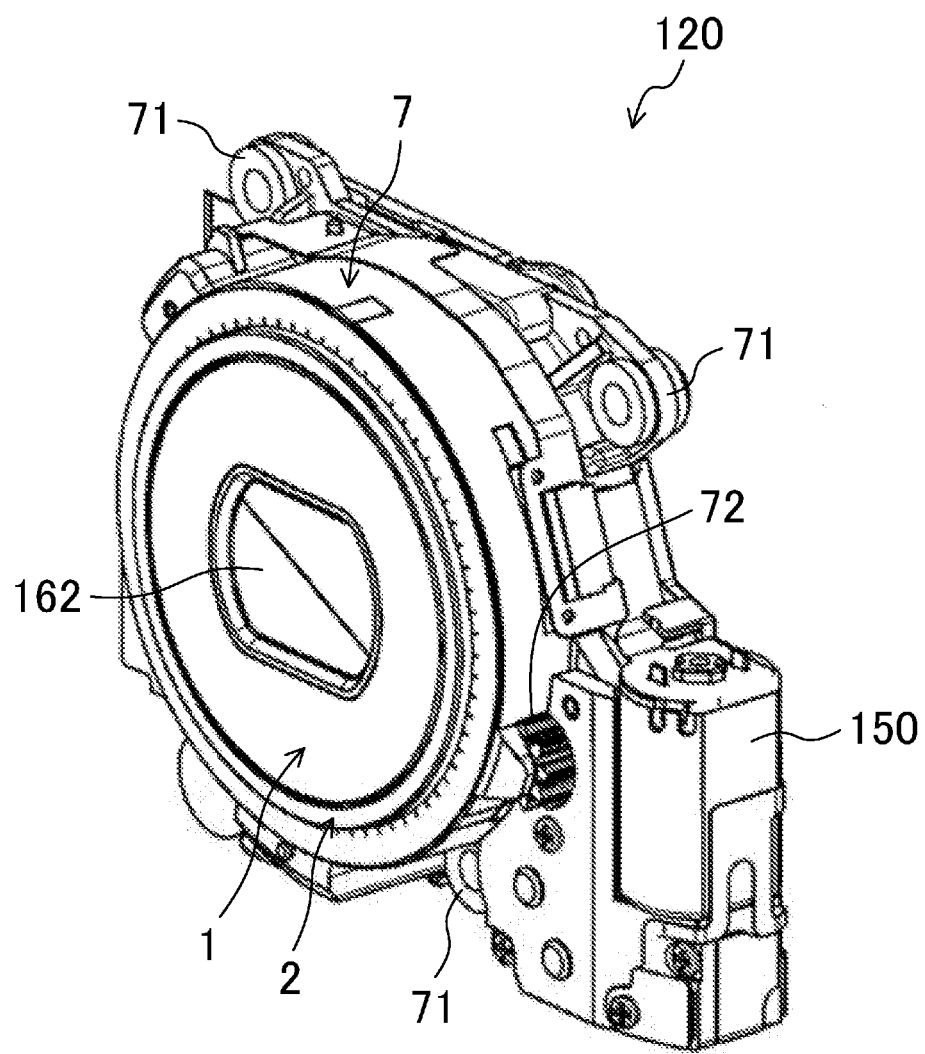
FIG. 2 is a perspective view of a lens barrel in a collapsed state.
Figure 3:
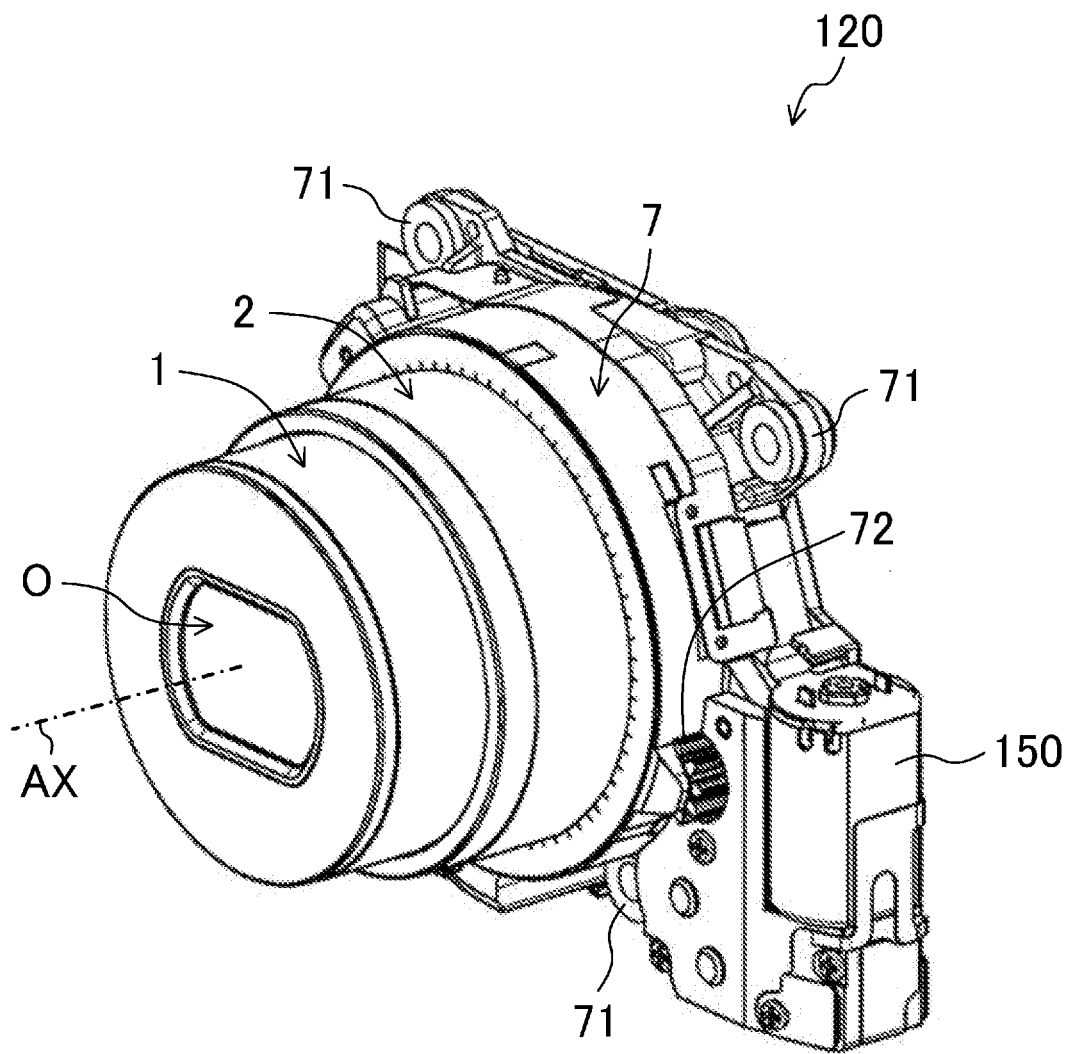
FIG. 3 is a perspective view of the lens barrel in a shooting state.
Figure 4:
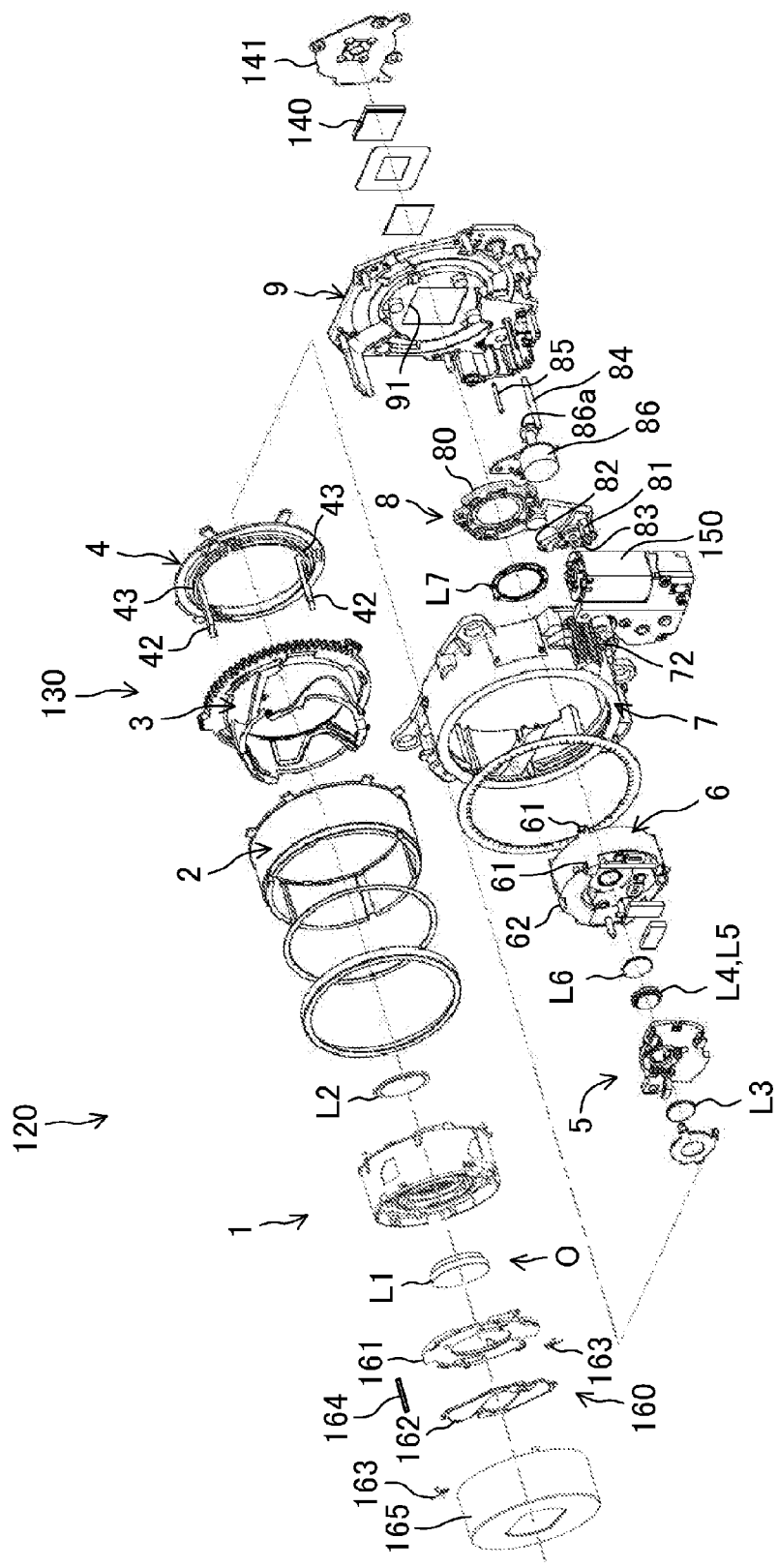
FIG. 4 is an exploded perspective view of the lens barrel.

FIG. 2 is a perspective view of the lens barrel 120 in the collapsed state. FIG. 3 is a perspective view of the lens barrel 120 in the shooting state. FIG. 4 is an exploded perspective view of the lens barrel 120. FIG. 5(A) is a cross-sectional view of the lens barrel 120 in the collapsed state. FIG. 5(B) is another cross-sectional view of the lens barrel 120 in the collapsed state, which differs from FIG. 5(A). FIG. 6(A) is a cross-sectional view of a wide-angle end of the lens barrel 120 in the shooting state. FIG. 6(B) is another cross-sectional view of the wide-angle end of the lens barrel 120 in the shooting state, which differs from FIG. 6(A). FIG. 7(A) is cross-sectional view of a telephoto end of the lens barrel 120 in the shooting state. FIG. 7(B) is another cross-sectional view of the telephoto end of the lens barrel 120 in the shooting state, which differs from FIG. 7(A).

The lens barrel 120 includes an optical system O and a lens drive mechanism 130. A CCD image sensor (hereinafter referred to as a "CCD") 140 is fixed to the lens barrel 120.

Figure 5:
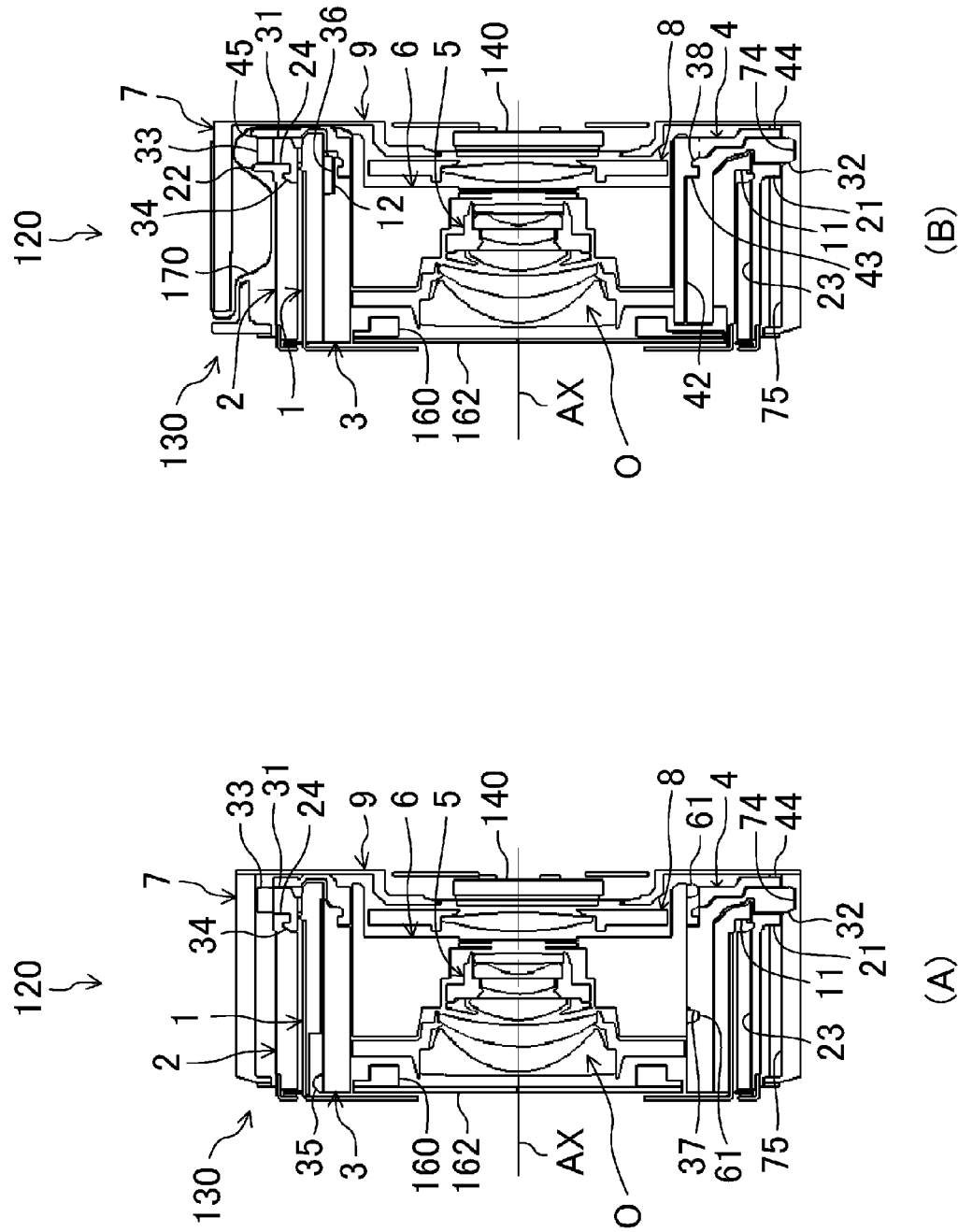
FIG. 5(A) is a cross-sectional view of the lens barrel in the collapsed state.
FIG. 5(B) is another cross-sectional view of the lens barrel in the collapsed state, which differs from FIG. 5(A).
Figure 6:
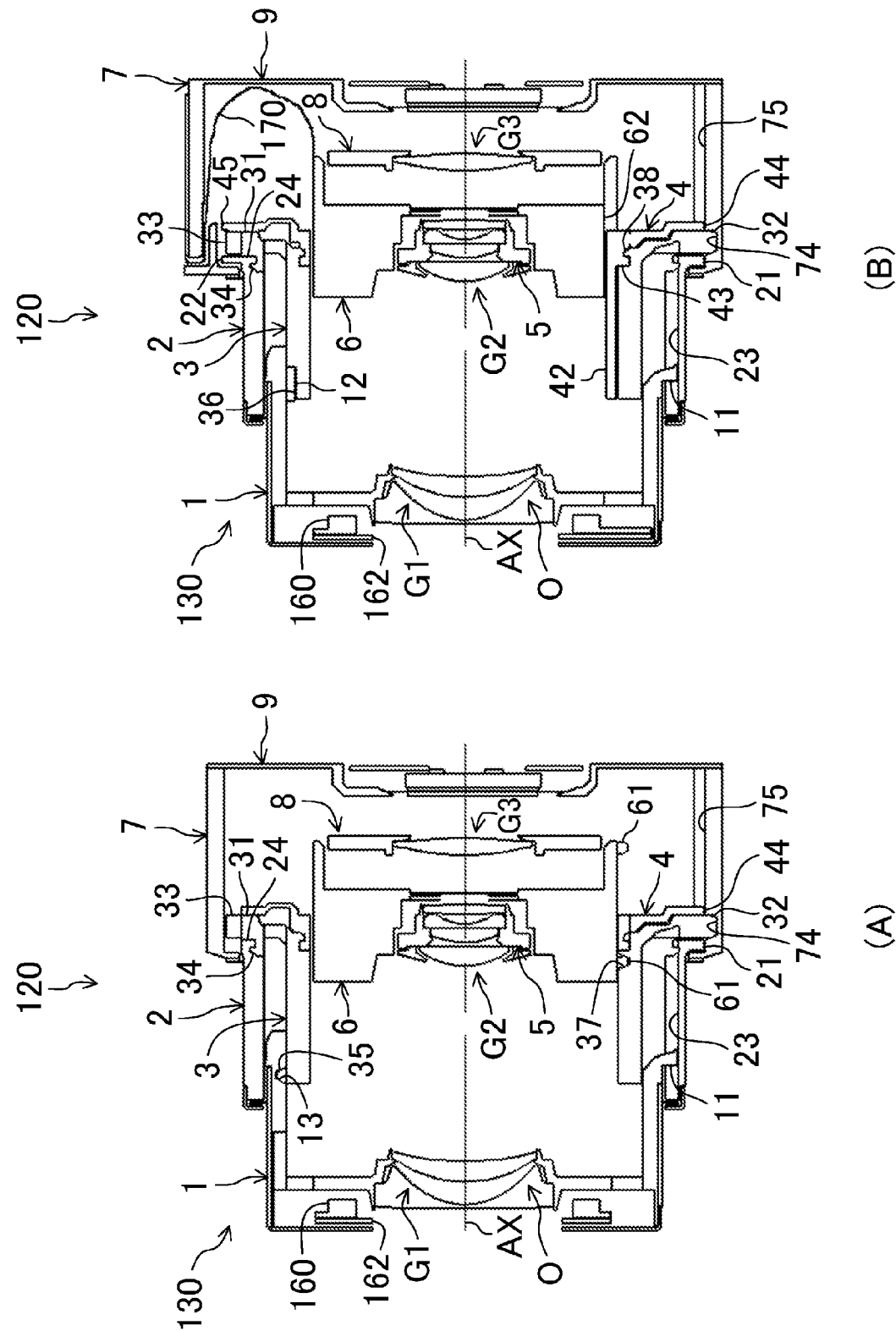
FIG. 6(A) is a cross-sectional view of a wide-angle end of the lens barrel in the shooting state.
FIG. 6(B) is another cross-sectional view of the wide-angle end of the lens barrel in the shooting state, which differs from FIG. 6(A).
Figure 7:
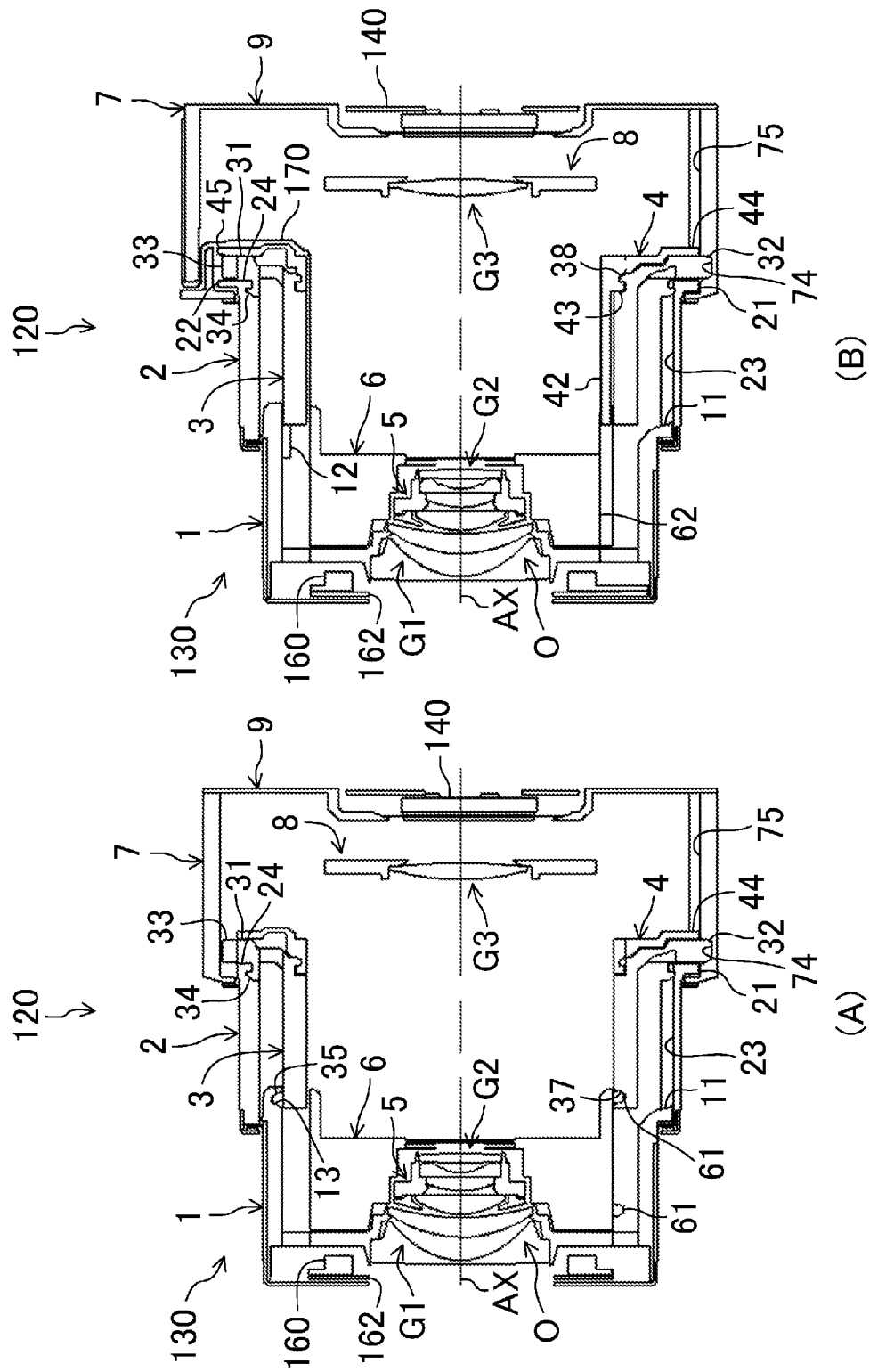
FIG. 7(A) is a cross-sectional view of a telephoto end of the lens barrel in the shooting state.
FIG. 7(B) is another cross-sectional view of the telephoto end of the lens barrel in the shooting state, which differs from FIG. 7(A).

The optical system O is configured to form an optical image of the object on a light receiving surface (imaging surface) of the CCD 140. Referring to FIGS. 5-7, the optical system O includes a first lens group G1, a second lens group G2, and a third lens group G3. The first lens group G1, the second lens group G2, and the third lens group G3 are arranged in this order from the side close to the object in the optical axis direction. Referring to FIG. 4, the first lens group G1 includes a first lens L1 and a second lens L2. The second lens group G2 includes a third lens L3, a fourth lens L4, a fifth lens L5, and a sixth lens L6. The third lens group G3 includes a seventh lens L7.

The lens barrel 120 supports the first to third lens groups G1-G3 such that the first to third lens groups G1-G3 are movable in the optical axis direction. The lens drive mechanism 130 moves the first to third lens groups G1-G3 in the optical axis direction. In the lens barrel 120, the focal length of the optical system O is changed by changing a distance between the first lens group G1 and the second lens group G2 and a distance between the second lens group G2 and the third lens group G3. The change in focal length is also called "zooming." The lens of the third lens group G3 is a focus lens, and changes a focus state of the optical system O by moving in the optical axis direction. The change in focus state is also called "focusing." Note that the optical system O may employ other lens configuration (e.g., the number and the shape of the lens).

The CCD 140 is configured to receive light from the object, convert the light into an electrical signal, and output the electrical signal. The CCD 140 is an example of the imaging device. The imaging device may be a CMOS image sensor.

<2-2. Lens Drive Mechanism>

Next, the lens drive mechanism 130 will be described. The lens drive mechanism 130 includes a first-group frame 1, a first-group translational frame 2, a cam frame 3, a second-group translational frame 4, a blur correction frame 5, a shutter unit 6, a fixed frame 7, a third-group frame 8, and a master flange 9.

The first-group frame 1 is configured to hold the first lens group G1. The blur correction frame 5 is configured to hold the second lens group G2. The third-group frame 8 is configured to hold the third lens group G3.

<2-2-1. Fixed Frame>

Figure 8:
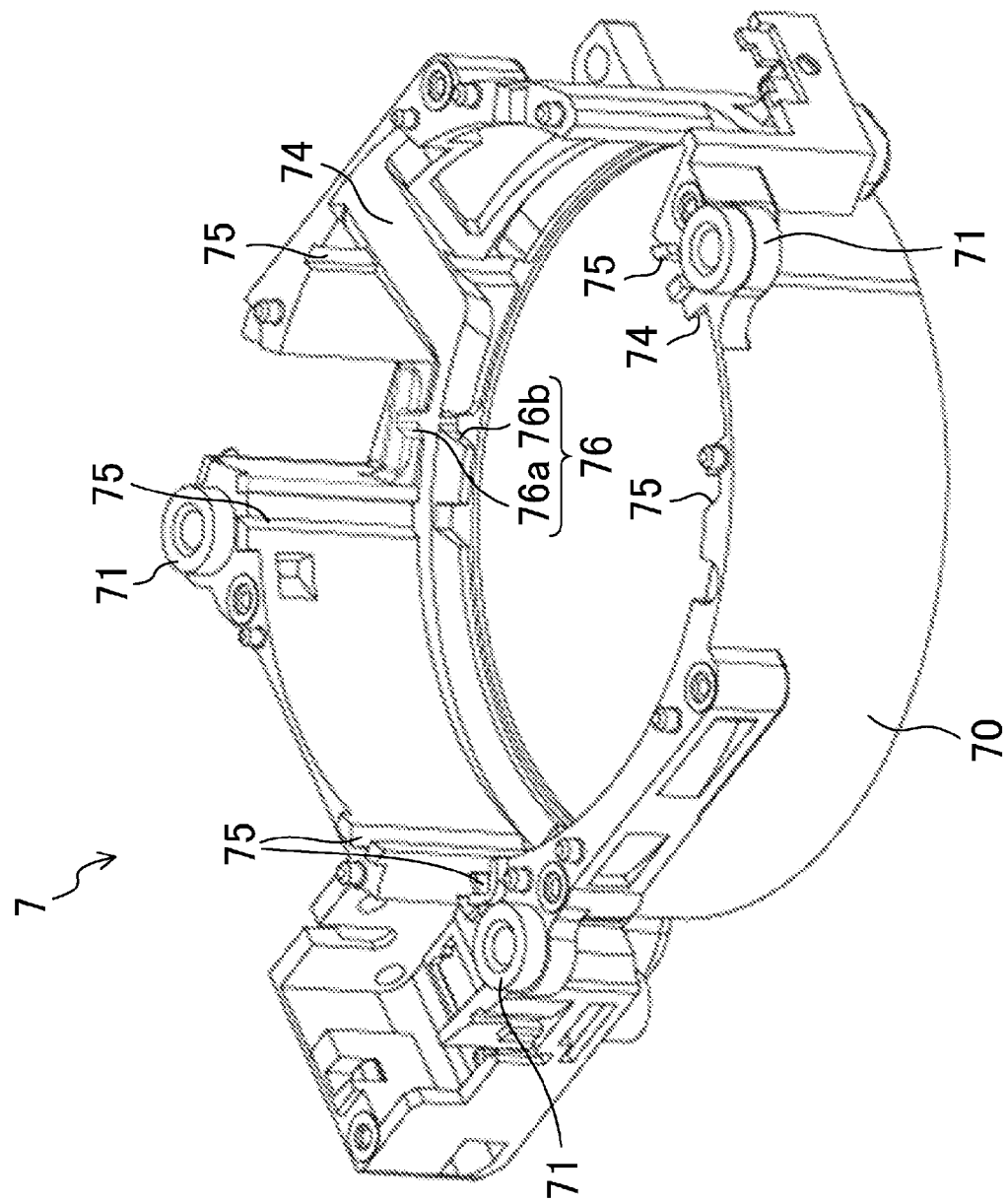
FIG. 8 is a perspective view of a fixed frame.

FIG. 8 is a perspective view of the fixed frame 7. The fixed frame 7 includes a cylindrical body part 70, an attachment part 71 configured to attach the fixed frame 7 to the camera body 110, and a drive gear 72. The attachment part 71 is provided so as to outwardly protrude in a back end part of the body part 70. The fixed frame 7 is attached to the camera body 110 through the attachment part 71. For example, the attachment part 71 is screwed to the camera body 110.

Referring to FIGS. 2-4, the drive gear 72 is attached to the body part 70 so as to rotate about an axis parallel to the optical axis AX. The drive gear 72 is exposed both inside and outside the body part 70. A zoom motor unit 150 is attached to an outer circumferential surface of the body part 70. The zoom motor unit 150 is engaged with the drive gear 72, and is configured to rotatably drive the drive gear 72.

The master flange 9 is attached to a back end of the body part 70. Bosses in each of which a screw hole is formed are formed at the back end of the body part 70. Screws are screwed into the screw holes of the bosses to fix the master flange 9 to the body part 70.

Three first cam grooves 74, six first translational grooves 75, and a single housing groove 76 are formed at an inner circumferential surface of the body part 70. Each of the first cam grooves 74 extends in a predetermined shape. The first translational grooves 75 extend parallel to the optical axis AX. A first notch 76*a* and a second notch 76*b* form the housing groove 76, and the housing groove 76 extends parallel to the optical axis AX. The housing groove 76 is formed so as to cross the first cam groove 74. The first notch 76*a* is formed in one of side walls defining the first cam groove 74, and the second notch 76*b* is formed in the other side wall defining the first cam groove 74.

<2-2-2. Cam Frame>

Figure 9:
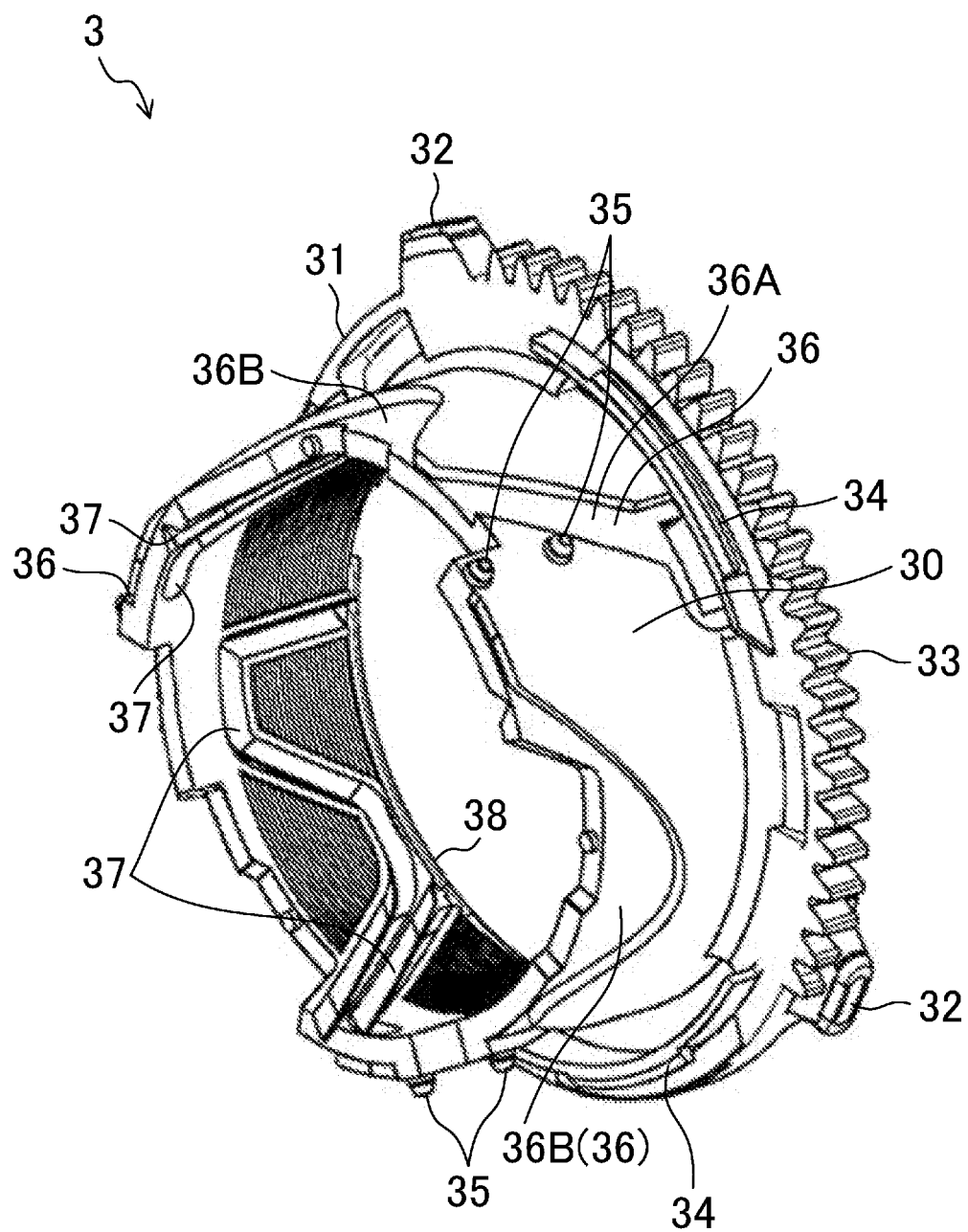
FIG. 9 is a perspective view of a cam frame.

FIG. 9 is a perspective view of the cam frame 3. The cam frame 3 includes a cylindrical body part 30 and a flange 31 formed so as to outwardly protrude in the radial direction at a back end of the body part 30.

Three first cam pins 32 and a gear part 33 are provided at an outer circumferential edge of the flange 31. The gear part 33 is provided in part of the entire periphery of the flange 31. Moreover, a first bayonet engagement part 34 is provided in the flange 31.

Six second cam pins 35 and three third cam grooves 36 are formed at an outer circumferential surface of the body part 30. The second cam pins 35 are, in pairs of two, provided at three parts of the body part 30 in the circumferential direction. The two second cam pins 35 of each pair are arranged parallel to the optical axis AX. Each of the third cam grooves 36 has a first zone 36A where there are both of side walls, and a second zone 36B where there is only one of the side walls. The first zone 36A extends from the back end to a front end of the body part 30 so as to be inclined toward the optical axis AX. The second zone 36B is formed in a front end part of the body part 30, and the side wall is not provided on the front in the optical axis direction in the second zone 36B. That is, the second zone 36B opens in the front end part of the body part 30. Note that the side wall on the front in the optical axis direction is not necessarily provided in the first zone 36A.

Six fourth cam grooves 37 and a second bayonet engagement part 38 are formed at an inner circumferential surface of the body part 30.

<2-2-3. First-Group Translational Frame>

Figure 10:
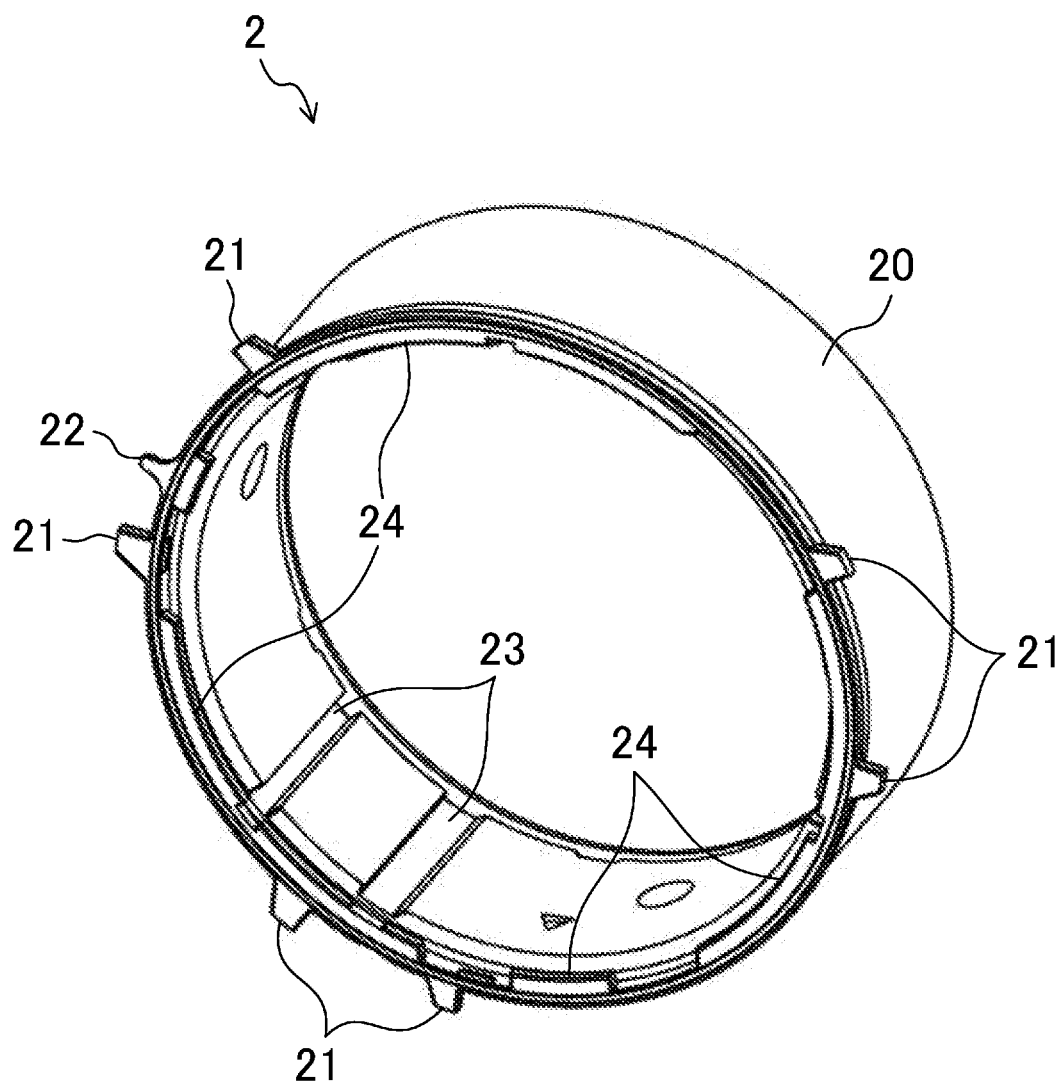
FIG. 10 is a perspective view of a first-group translational frame.

FIG. 10 is a perspective view of the first-group translational frame 2. The first-group translational frame 2 includes a cylindrical body part 20. Six engagement parts 21 each outwardly protruding in the radial direction and a single second protrusion 22 outwardly protruding in the radial direction are provided at a back end of the body part 20. The outer diameter of the body part 20 is smaller than that of the gear part 33 of the cam frame 3. That is, the distance from the optical axis AX to an outer circumferential surface of the body part 20 is shorter than the distance from the optical axis AX to a tip end of the gear part 33. Moreover, the distance from the optical axis AX to a tip end of the second protrusion 22 is longer than the distance from the optical axis AX to the tip end of the gear part 33.

Six second translational grooves 23 extending in the optical axis direction and a third bayonet engagement part 24 extending in the circumferential direction in a back end part of the body part 20 are formed at an inner circumferential surface of the body part 20.

<2-2-4. Second-Group Translational Frame>

Figure 11:
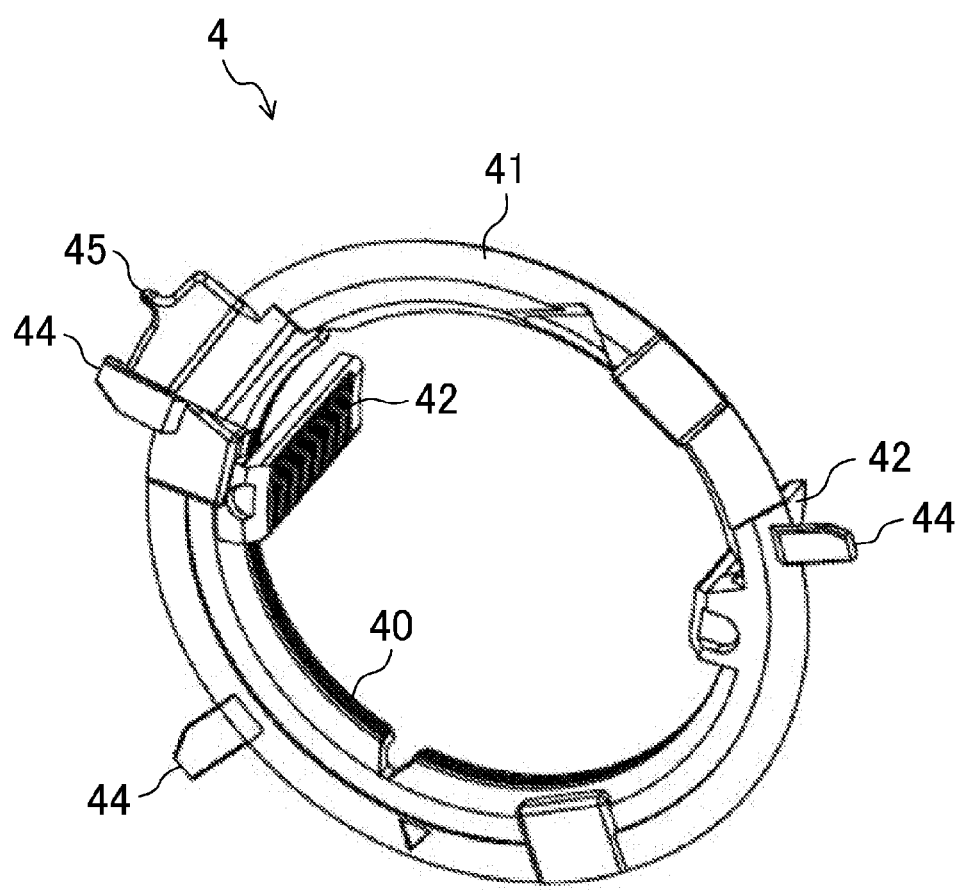
FIG. 11 is a perspective view of a second-group translational frame.

FIG. 11 is a perspective view of the second-group translational frame 4. The second-group translational frame 4 includes a cylindrical body part 40, a flange 41 outwardly protruding from the body part 40 in the radial direction and extending in the circumferential direction, and two arm parts 42 extending from the body part 40 toward the front in the optical axis direction. The outer diameter of the body part 40 is smaller than that of the gear part 33 of the cam frame 3. That is, the distance from the optical axis AX to an outer circumferential surface of the body part 40 is shorter than the distance from the optical axis AX to the tip end of the gear part 33. A fourth bayonet engagement part 43 (see FIGS. 5-7) is provided at the outer circumferential surface of the body part 40.

Three engagement parts 44 outwardly protruding in the radial direction and a single first protrusion 45 outwardly protruding in the radial direction are provided in the flange 41. The distance from the optical axis AX to a tip end of the first protrusion 45 is longer than the distance from the optical axis AX to the tip end of the gear part 33.

<2-2-5. First-Group Frame>

Figure 12:
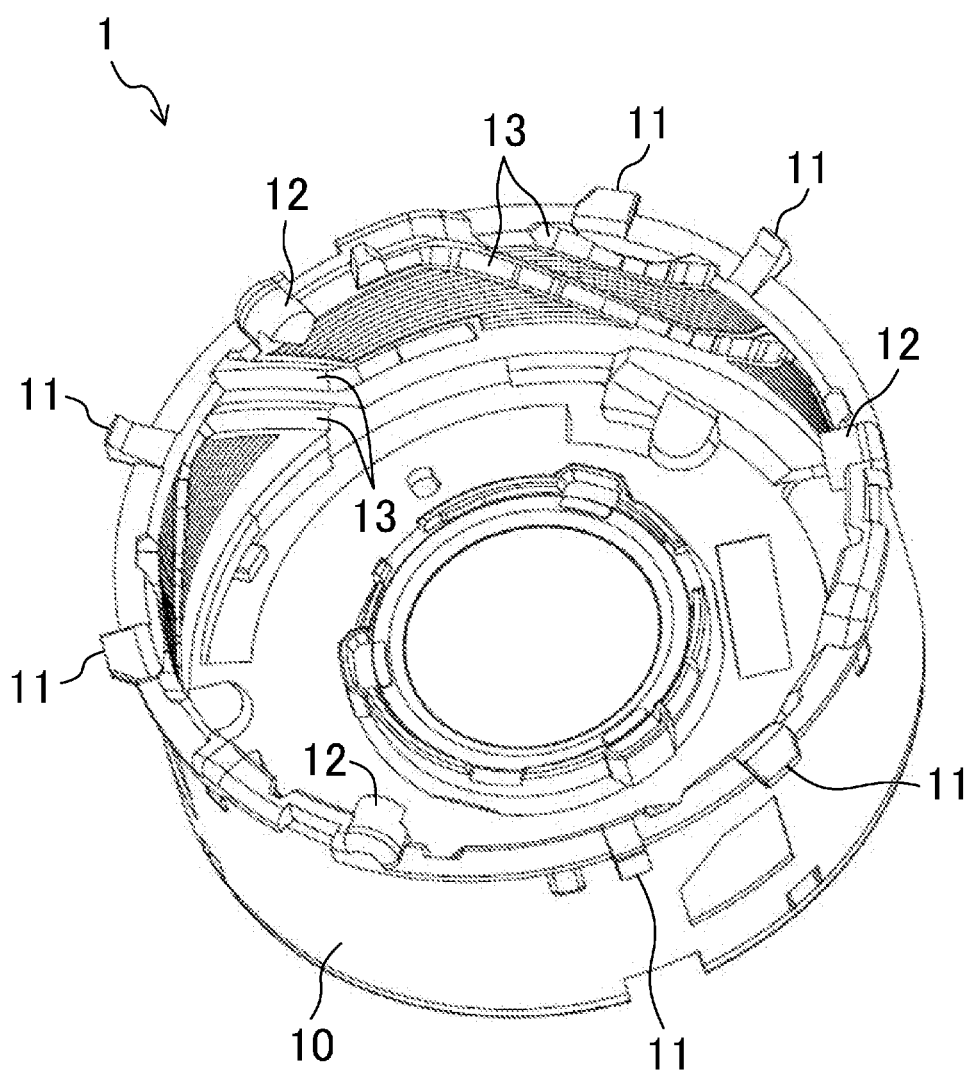
FIG. 12 is a perspective view of a first-group frame.

FIG. 12 is a perspective view of the first-group frame 1. The first-group frame 1 includes a cylindrical body part 10. The body part 10 is configured to hold the first lens group G1. Six engagement parts 11 are provided at an outer circumferential surface of the body part 10. Three third cam pins 12 and six second cam grooves 13 are formed at an inner circumferential surface of the body part 10.

Referring to FIG. 4, a barrier cam ring 160 is attached to a front part of the body part 10. The barrier cam ring 160 includes a cylindrical body part 161, barrier blades 162, a first spring 163, and a second spring 164. When the lens barrel 120 is in the collapsed state, the barrier blades 162 are closed. In such a manner, the barrier blades 162 protect the first lens group G1, and block light from entering the optical system O. When the lens barrel 120 is in the shooting state, the barrier blades 162 are opened, and allow light to enter the optical system O.

A decorative frame 165 is, from the front, attached to the body part 10 with the barrier cam ring 160 being attached to the front part of the body part 10.

<2-2-6. Blur Correction Frame>

The blur correction frame 5 is configured to hold the second lens group G2. Referring to FIGS. 5-7, the blur correction frame 5 is supported by the shutter unit 6. Movement of the blur correction frame 5 relative to the shutter unit 6 in the optical axis direction is restricted. The blur correction frame 5 is supported so as to move relative to the shutter unit 6 in a plane perpendicular to the optical axis AX. The blur correction frame 5 is moved relative to the shutter unit 6 by a drive mechanism in the plane perpendicular to the optical axis AX. The blur correction frame 5, i.e., the second lens group G2, moves in the plane perpendicular to the optical axis AX, thereby changing the position of the optical image on the light receiving surface of the CCD 140. For example, the blur correction frame 5 is moved so that blur of the optical image due to movement of the digital camera 100 can be reduced.

<2-2-7. Shutter Unit>

The shutter unit 6 includes a shutter which is not shown in the figure. The shutter unit 6 allows light passage by opening the shutter. The shutter unit 6 blocks light by closing the shutter. That is, the shutter unit 6 is configured to control passage of light through the optical system O and blocking of light entering the optical system O. The shutter unit 6 includes, e.g., an actuator configured to drive shutter blades of the shutter. Referring to FIGS. 5-7, a flexible printed circuit board (hereinafter referred to as an "FPC board") 170 is electrically connected to the shutter unit 6. Control signals are transmitted from a main circuit to the actuator of the shutter unit 6 through the FPC board 170. Referring to FIG. 4, six fourth cam pins 61 and two third translational grooves 62 are formed at an outer circumferential surface of the shutter unit 6.

<2-2-8. Third-Group Frame>

The third-group frame 8 is configured to hold the third lens group G3. Referring to FIG. 4, the third-group frame 8 includes a body part 80, a bearing 81, a rotation restriction part 82, and an engagement part 83. The bearing 81 and the rotation restriction part 82 are engaged respectively with a first guide pole 84 and a second guide pole 85 which are provided in the master flange 9. The first guide pole 84 and the second guide pole 85 extend in the optical axis direction. In such a manner that the first guide pole 84 is inserted into the bearing 81, the third-group frame 8 is movable along the first guide pole 84 in the optical axis direction. Moreover, engagement of the bearing 81 and the first guide pole 84 restricts movement of the third-group frame 8 in the plane perpendicular to the optical axis AX. In such a manner that the rotation restriction part 82 is engaged with the second guide pole 85, rotation of the third-group frame 8 about the first guide pole 84 is restricted.

The engagement part 83 is engaged with a focus motor unit 86. Specifically, the focus motor unit 86 is attached to the master flange 9. The focus motor unit 86 includes a motor, a lead screw extending in the optical axis direction and rotating by the motor, and a nut 86a engaged with the lead screw. The engagement part 83 is engaged with the nut 86a. That is, the third-group frame 8 moves in the optical axis direction together with the nut 86a moving in the optical axis direction by actuation of the motor.

<2-2-9. Master Flange>

The master flange 9 is a plate-shaped member. Referring to FIG. 4, a rectangular opening 91 is formed at the center of the master flange 9. The CCD 140 is attached to a back surface of the master flange 9 with an attachment plate 141 being interposed therebetween. The light receiving surface of the CCD 140 faces the front.

<2-3. Relationship in Member Engagement>

Referring to FIGS. 5-7, the first-group translational frame 2 is accommodated inside the fixed frame 7, and is supported by the fixed frame 7. The engagement part 21 of the first-group translational frame 2 is engaged with the first translational groove 75 of the fixed frame 7. That is, the first-group translational frame 2 is movable in the optical axis direction in the state in which rotation of the first-group translational frame 2 relative to the fixed frame 7 is restricted.

The first-group frame 1 is accommodated inside the first-group translational frame 2, and is supported by the first-group translational frame 2. The engagement part 11 of the first-group frame 1 is engaged with the second translational groove 23 of the first-group translational frame 2. That is, the first-group frame 1 is movable in the optical axis direction in the state in which rotation of the first-group frame 1 relative to the first-group translational frame 2 is restricted. Since rotation of the first-group translational frame 2 relative to the fixed frame 7 is restricted, rotation of the first-group frame 1 relative to the fixed frame 7 is also restricted.

The cam frame 3 is accommodated inside the first-group frame 1. The flange 31 of the cam frame 3 is positioned on the back relative to a back end of the first-group frame 1 and a back end of the first-group translational frame 2. The first cam pin 32 of the cam frame 3 is engaged with the first cam groove 74 of the fixed frame 7. Thus, the cam frame 3 is supported by the fixed frame 7. Moreover, the gear part 33 of the cam frame 3 is engaged with the drive gear 72 provided in the fixed frame 7. That is, the cam frame 3 is rotatably driven by the zoom motor unit 150 through the drive gear 72. In such a state, the first cam pin 32 is guided to the first cam groove 74. With such movement, the cam frame 3 rotates while moving in the optical axis direction.

The cam frame 3 is engaged with the first-group translational frame 2 and the first-group frame 1. Specifically, the first bayonet engagement part 34 of the cam frame 3 is engaged with the third bayonet engagement part 24 of the first-group translational frame 2. Thus, relative rotation of the first-group translational frame 2 and the cam frame 3 is allowed, and, on the other hand, relative movement in the optical axis direction is restricted. That is, when the cam frame 3 rotates while moving in the optical axis direction, the first-group translational frame 2 moves in the optical axis direction together with the cam frame 3. However, rotation of the first-group translational frame 2 relative to the fixed frame 7 is restricted by engagement of the engagement part 21 and the first translational groove 75. Moreover, the second cam pin 35 of the cam frame 3 is engaged with the second cam groove 13 of the first-group frame 1. Rotation of the first-group frame 1 relative to the first-group translational frame 2 is restricted by engagement of the engagement part 11 and the second translational groove 23. Thus, when the cam frame 3 rotates, the first-group frame 1 moves in the optical axis direction such that the second cam pin 35 moves relative to the second cam groove 13 in the second cam groove 13.

The third cam pin 12 of the first-group frame 1 is engaged with the third cam groove 36 of the cam frame 3. The third cam groove 36 is in a shape in accordance with a movement track of the third cam pin 12 when the first-group frame 1 moves relative to the cam frame 3. Note that one of groove walls of the third cam groove 36 positioned on the back in the optical axis direction has a slight clearance with the third cam pin 12.

The second-group translational frame 4 is accommodated inside the cam frame 3. The flange 41 of the second-group translational frame 4 is positioned on the back relative to a back end of the cam frame 3. The second-group translational frame 4 is supported by the cam frame 3 and the fixed frame 7. Specifically, the engagement part 44 of the second-group translational frame 4 is engaged with the first translational groove 75 of the fixed frame 7. That is, the second-group translational frame 4 is movable in the optical axis direction in the state in which rotation of the second-group translational frame 4 relative to the fixed frame 7 is restricted. Moreover, the fourth bayonet engagement part 43 of the second-group translational frame 4 is engaged with the second bayonet engagement part 38 of the cam frame 3. This allows relative rotation of the second-group translational frame 4 and the cam frame 3, and restricts relative movement of the second-group translational frame 4 and the cam frame 3 in the optical axis direction. That is, when the cam frame 3 rotates while moving in the optical axis direction, the second-group translational frame 4 moves in the optical axis direction together with the cam frame 3. Note that rotation of the second-group translational frame 4 relative to the fixed frame 7 is restricted by engagement of the engagement part 44 and the first translational groove 75.

The shutter unit 6 is accommodated inside the cam frame 3 and the second-group translational frame 4, and is supported by the cam frame 3 and the second-group translational frame 4. The arm part 42 of the second-group translational frame 4 is engaged with the third translational groove 62 of the shutter unit 6. That is, the shutter unit 6 is movable in the optical axis direction in the state in which rotation of the shutter unit 6 relative to the second-group translational frame 4 is restricted. Since rotation of the second-group translational frame 4 relative to the fixed frame 7 is restricted, rotation of the shutter unit 6 relative to the fixed frame 7 is also restricted. Moreover, the fourth cam pin 61 of the shutter unit 6 is engaged with the fourth cam groove 37 of the cam frame 3. Rotation of the shutter unit 6 relative to the second-group translational frame 4 is restricted. Thus, when the cam frame 3 rotates, the shutter unit 6 moves in the optical axis direction such that the fourth cam pin 61 moves relative to the fourth cam groove 37 in the fourth cam groove 37. In such a state, since the blur correction frame 5 is supported by the shutter unit 6, the blur correction frame 5 moves in the optical axis direction together with the shutter unit 6.

The third-group frame 8 is, as described above, supported by the first guide pole 84 and the second guide pole 85 which are provided in the master flange 9, and is driven in the optical axis direction by the focus motor unit 86.

In the lens barrel 120 configured as described above, when the zoom motor unit 150 is operated, the cam frame 3 is rotatably driven, and moves in the optical axis direction while rotating. In association with such movement, the first-group frame 1, the blur correction frame 5, and the shutter unit 6 also move in the optical axis direction. The travel distance of the first-group frame 1, the blur correction frame 5, and the shutter unit 6 in the optical axis direction is determined by the shape of each cam groove. Meanwhile, the third-group frame 8 is driven by the focus motor unit 86, and moves in the optical axis direction.

<3. Protection of FPC Board>

Figure 13:
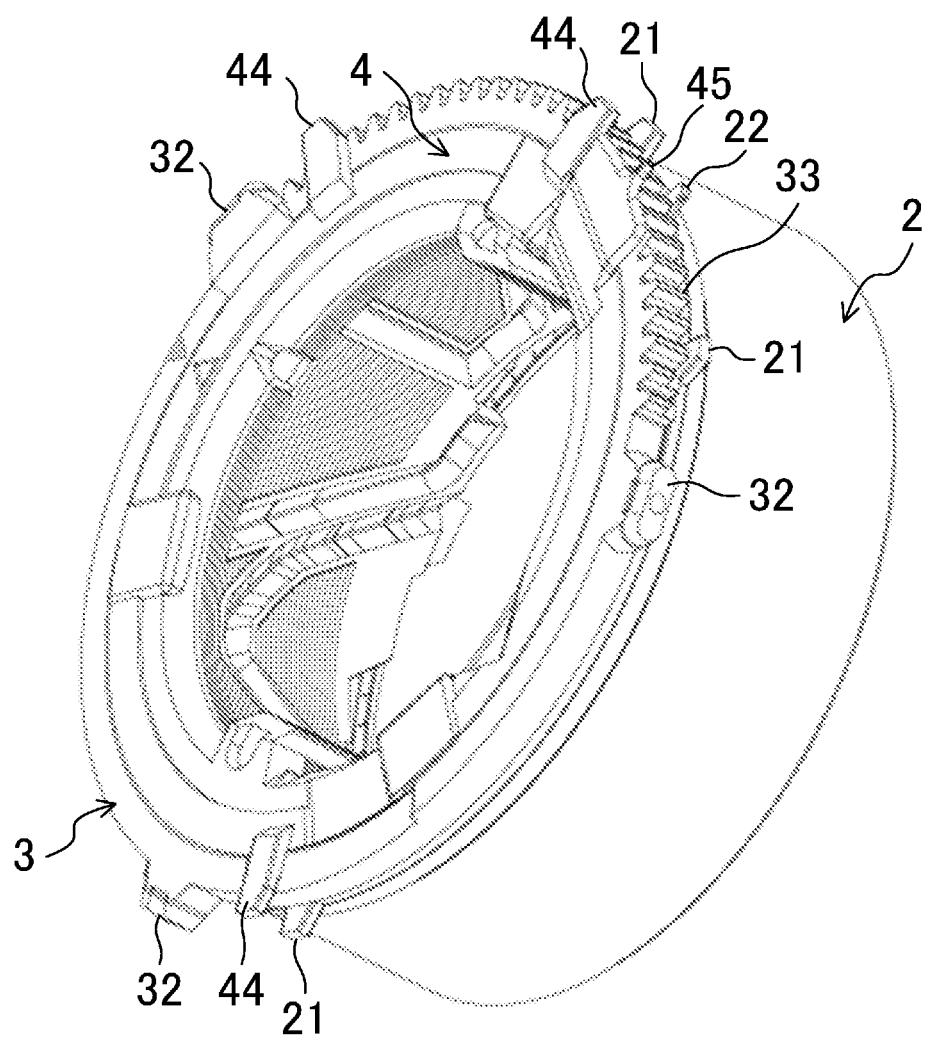
FIG. 13 is a perspective view of the first-group translational frame, the cam frame, and the second-group translational frame which are assembled together.
Figure 14:
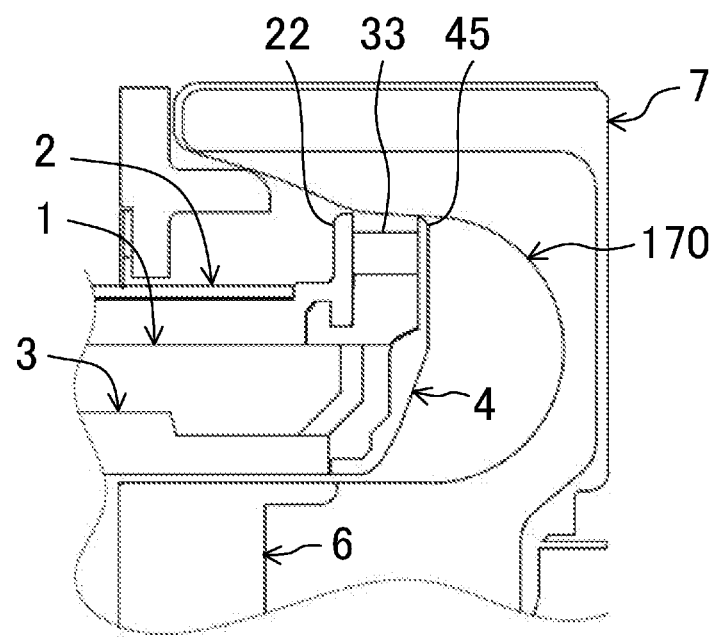
FIG. 14 is an enlarged cross-sectional view of the lens barrel in the state in which a flexible printed circuit board crosses a gear part.

FIG. 13 is a perspective view of the first-group translational frame 2, the cam frame 3, and the second-group translational frame 4 which are assembled together. FIG. 14 is an enlarged cross-sectional view of the lens barrel in the state in which the FPC board 170 crosses the gear part 33.

As described above, the FPC board 170 configured to transmit control signals from the main circuit is connected to the shutter unit 6. The FPC board 170 connected to the shutter unit 6 passes backward between the shutter unit 6 and each of the cam frame 3 and the second-group translational frame 4. Then, the FPC board 170 extends around the back of the second-group translational frame 4 toward the outside in the radial direction, and is drawn onto an outer circumferential surface of the fixed frame 7 through the front thereof. One end of the FPC board 170 is electrically connected to the main circuit at the outer circumferential surface of the fixed frame 7. The connection of the FPC board 170 to the main circuit is made by solder jointing or connector connection. Although the gear part 33 of the cam frame 3 is engaged with the zoom motor unit 150 of the fixed frame 7, a clearance is, in other part, formed between the gear part 33 and the fixed frame 7.

The FPC board 170 passes between the gear part 33 and the fixed frame 7 in part where the gear part 33 is not engaged with the zoom motor unit 150, and crosses the gear part 33 in the optical axis direction.

Since the FPC board 170 has flexibility, the FPC board 170 is deformed in various ways in association with, e.g., movement of the shutter unit 6 between the collapsed state and the shooting state and movement of the shutter unit 6 upon zooming. In such a state, if the FPC board 170 contacts the gear part 33, the FPC board 170 may be caught by the gear part 33, resulting in a damage of the FPC board 170.

Thus, the first protrusion 45 outwardly protruding beyond the gear part 33 in the radial direction is, in the second-group translational frame 4, provided at a circumferential position corresponding to the FPC board 170 on a side of the gear part 33 opposite to the object (i.e., on the back) in the optical axis direction. In addition, the second protrusion 22 outwardly protruding beyond the gear part 33 in the radial direction is, in the first-group translational frame 2, provided at a circumferential position corresponding to the FPC board 170 on a side of the gear part 33 close to the object (i.e., on the front) in the optical axis direction. Therefore, even if the FPC board 170 approaches the gear part 33 while crossing the gear part 33, the possibility of contact between the FPC board 170 and the gear part 33 is reduced by the first protrusion 45 and the second protrusion 22.

Specifically, rotation of each of the first-group translational frame 2, the second-group translational frame 4, and the shutter unit 6 relative to the fixed frame 7 is restricted. Thus, even if the first-group translational frame 2, the second-group translational frame 4, and the shutter unit 6 move in the optical axis direction, rotation of each of the second protrusion 22, the first protrusion 45, and the FPC board 170 relative to the fixed frame 7 is restricted, and therefore the positions thereof in the circumferential direction are not changed. That is, at the circumferential positions corresponding to the FPC board 170, the second protrusion 22 is arranged in front of the gear part 33, and the first protrusion 45 is arranged in back of the gear part 33. Such a positional relationship is maintained even if the first-group translational frame 2, the second-group translational frame 4, and the shutter unit 6 move in the optical axis direction.

The cam frame 3, the second-group translational frame 4, and the shutter unit 6 move in the optical axis direction depending on the state of the lens barrel 120. Thus, the FPC board 170 is deformed in various ways, and sometimes crosses the gear part 33 of the cam frame 3 from the back to the front. As described above, at the circumferential positions corresponding to the FPC board 170, the second protrusion 22 and the first protrusion 45 are arranged respectively in front and back of the gear part 33. Thus, even if the FPC board 170 approaches the gear part 33, movement of the FPC board 170 toward the inside in the radial direction is restricted by the first protrusion 45 and the second protrusion 22, thereby reducing or preventing contact between the FPC board 170 and the gear part 33.

Since the first-group frame 1 and the second-group translational frame 4 move in the optical axis direction together with the cam frame 3, the positional relationship between each of the first protrusion 45 and the second protrusion 22 and the gear part 33 in the optical axis direction is maintained. That is, when the first protrusion 45 and the gear part 33 are apart from each other in the optical axis direction, or the second protrusion 22 and the gear part 33 are apart from each other in the optical axis direction, even if the first protrusion 45 and the second protrusion 22 restrict movement of the FPC board 170 toward the inside in the radial direction, there is a possibility that the FPC board 170 contacts the gear part 33 at part apart from the first protrusion 45 or the second protrusion 22. However, since the positional relationship between each of the first protrusion 45 and the second protrusion 22 and the gear part 33 in the optical axis direction is maintained, the state in which the first protrusion 45 and the second protrusion 22 reduces or prevents contact between the FPC board 170 and the gear part 33 is also maintained. That is, in all states from the collapsed state of the lens barrel 120 to the telephoto end of the lens barrel 120 in the shooting state, the FPC board 170 is protected by the first protrusion 45 and the second protrusion 22.

The first protrusion 45 increases the dimension of the second-group translational frame 4 in the radial direction. Moreover, the second protrusion 22 increases the dimension of the first-group translational frame 2 in the radial direction. However, the housing groove 76 is formed at an inner circumferential surface of the fixed frame 7. The first protrusion 45 and the second protrusion 22 are fitted into the housing groove 76. Thus, the dimension of the fixed frame 7 can be the same as the dimension in the case where the first protrusion 45 and the second protrusion 22 are not provided respectively in the second-group translational frame 4 and the first-group translational frame 2. That is, an increase in size of the lens barrel 120 can be reduced or prevented while a damage of the FPC board 170 can be reduced or prevented.

Note that the housing groove 76 is formed so as to cross the first cam groove 74. Specifically, in part of the first cam groove 74 where the first cam pin 32 is not positioned when the first protrusion 45 and the second protrusion 22 cross the first cam groove 74, the housing groove 76 crosses the first cam groove 74. Thus, a limited space of the fixed frame 7 at the inner circumferential surface thereof can be effectively used to form the housing groove 76. In addition, the width of the housing groove 76 is smaller than the dimension of the first cam pin 32. That is, in the state in which the housing groove 76 crosses the first cam groove 74, the first notch 76*a* and the second notch 76*b* are formed respectively in the side walls of the first cam groove 74. If the width of the housing groove 76 is larger, the first cam pin 32 is caught by the first notch 76*a* or the second notch 76*b*, and therefore the first cam pin 32 cannot be smoothly guided in the first cam groove 74. The housing groove 76 having a small width reduces the catching of the first cam pin 32 by the first notch 76*a* or the second notch 76*b*, and the first cam pin 32 can be smoothly guided in the first cam groove 74.

<4. Advantages>

Thus, the lens barrel 120 includes the fixed frame 7 having the optical axis AX; the cam frame 3 provided inside the fixed frame 7 and configured to rotate about the optical axis AX relative to the fixed frame 7; the second-group translational frame 4 provided inside the cam frame 3 and configured to move in the optical axis direction in the state in which rotation of the second-group translational frame 4 about the optical axis AX relative to the fixed frame 7 is restricted; the shutter unit 6 provided inside the second-group translational frame 4 and configured to move in the optical axis direction in the state in which rotation of the shutter unit 6 about the optical axis AX relative to the fixed frame 7 is restricted; and the FPC board 170 connected, at one end thereof, to the shutter unit 6 so as to extend to the fixed frame 7 by way of the side of the cam frame 3 opposite to the object in the optical axis direction, and connected, at the other end thereof, to the fixed frame 7. The gear part 33 is provided at an outer circumferential surface of the cam frame 3. In the second-group translational frame 4, the first protrusion 45 outwardly protruding beyond the gear part 33 in the radial direction about the optical axis AX is provided at the position corresponding to the FPC board 170 in the circumferential direction about the optical axis AX on the side of the gear part 33 opposite to the object in the optical axis direction.

According to the foregoing configuration, the FPC board 170 extends from the shutter unit 6 to the fixed frame 7 by way of the side of the cam frame 3 opposite to the object. Thus, depending on a positional relationship among the cam frame 3, the shutter unit 6, and the fixed frame 7 in the optical axis direction, the FPC board 170 may cross the gear part 33 of the cam frame 3 back and forth. Rotation of each of the second-group translational frame 4, the shutter unit 6, and the FPC board 170 relative to the fixed frame 7 is restricted. Moreover, the first protrusion 45 outwardly protruding beyond the gear part 33 in the radial direction is, in the second-group translational frame 4, provided at the position corresponding to the FPC board 170 in the circumferential direction about the optical axis AX on the side of the gear part 33 opposite to the object in the optical axis direction. Thus, even if the FPC board 170 approaches the gear part 33 in part where the FPC board 170 crosses the gear part 33, movement of the FPC board 170 is restricted by the first protrusion 45. This reduces the possibility of contact between the FPC board 170 and the gear part 33. As a result, a damage of the FPC board 170 can be reduced or prevented.

The lens barrel 120 further includes the first-group translational frame 2 provided inside the fixed frame 7 and outside the cam frame 3 and configured to move in the optical axis direction in the state in which rotation of the first-group translational frame 2 about the optical axis AX relative to the fixed frame 7 is restricted. In the first-group translational frame 2, the second protrusion 22 outwardly protruding beyond the gear part 33 in the radial direction about the optical axis AX is provided at the position corresponding to the FPC board 170 in the circumferential direction about the optical axis AX on the side of the gear part 33 close to the object in the optical axis direction.

According to the foregoing configuration, rotation of the first-group translational frame 2 relative to the fixed frame 7 is also restricted. Moreover, the second protrusion 22 outwardly protruding beyond the gear part 33 in the radial direction is, in the first-group translational frame 2, provided at the position corresponding to the FPC board 170 in the circumferential direction about the optical axis AX on the side of the gear part 33 close to the object in the optical axis direction. At the positions corresponding to the FPC board 170 in the circumferential direction, the second protrusion 22 and the first protrusion 45 are arranged respectively in front and back of the gear part 33. Thus, even if the FPC board 170 approaches the gear part 33 in part where the FPC board 170 crosses the gear part 33, movement of the FPC board 170 is restricted by the first protrusion 45 and the second protrusion 22. This reduces the possibility of contact between the FPC board 170 and the gear part 33. As a result, a damage of the FPC board 170 can be reduced or prevented.

The first cam pin 32 is provided at the outer circumferential surface of the cam frame 3. The first cam groove 74 engaged with the first cam pin 32 and the housing groove 76 which crosses the first cam groove 74 and through which the first protrusion 45 passes when the second-group translational frame 4 moves relative to the fixed frame 7 in the optical axis direction are formed at the inner circumferential surface of the fixed frame 7.

According to the foregoing configuration, an increase in size of the lens barrel 120 can be reduced or prevented even in the configuration in which the first protrusion 45 outwardly protruding in the radial direction is provided in the second-group translational frame 4. Specifically, when the second-group translational frame 4 moves relative to the fixed frame 7 in the optical axis direction, the first protrusion 45 is accommodated in the housing groove 76. Thus, contact between the first protrusion 45 and the fixed frame 7 can be avoided without increasing the diameter of the fixed frame 7. As a result, an increase in size of the fixed frame 7 can be reduced or prevented.

Moreover, when the second-group translational frame 4 moves relative to fixed frame 7 in the optical axis direction, the second protrusion 22 also passes through the housing groove 76.

That is, when the second-group translational frame 4 moves relative to the fixed frame 7 in the optical axis direction, the second protrusion 22 is accommodated in the housing groove 76. Thus, contact between the second protrusion 22 and the fixed frame 7 can be avoided without increasing the diameter of the fixed frame 7. As a result, an increase in size of the fixed frame 7 can be reduced or prevented.

The second-group translational frame 4 is configured to move in the optical axis direction together with the cam frame 3.

According to the foregoing configuration, even if the cam frame 3 and the second-group translational frame 4 move in the optical axis direction, the distance between the first protrusion 45 and the gear part 33 in the optical axis direction is maintained. If the first protrusion 45 and the gear part 33 are apart from each other in the optical axis direction, inward movement of the FPC board 170 in the radial direction cannot be restricted at part apart from the first protrusion 45, and therefore the FPC board 170 and the gear part 33 may come into contact with each other. By maintaining the distance between the first protrusion 45 and the gear part 33 in the optical axis direction, the state in which contact between the FPC board 170 and the gear part 33 is reduced or prevented by the first protrusion 45 can be maintained.

The first-group translational frame 2 is configured to move in the optical axis direction together with the cam frame 3.

According to the foregoing configuration, even when the first-group translational frame 2 and the cam frame 3 move in the optical axis direction, the distance between the second protrusion 22 and the gear part 33 in the optical axis direction is maintained. If the second protrusion 22 and the gear part 33 are apart from each other in the optical axis direction, inward movement of the FPC board 170 in the radial direction cannot be restricted at part apart from the second protrusion 22, and therefore the FPC board 170 and the gear part 33 may come into contact with each other. By maintaining the distance between the second protrusion 22 and the gear part 33 in the optical axis direction, the state in which contact between the FPC board 170 and the gear part 33 is reduced or prevented by the second protrusion 22 can be maintained.

Other Embodiment

As described above, the foregoing embodiment has been described as example techniques disclosed in the present application. However, the techniques according to the present disclosure are not limited to the foregoing embodiment, but are also applicable to those where modifications, substitutions, additions, and omissions are made. In addition, elements described in the foregoing embodiment may be combined to provide a different embodiment. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

The foregoing embodiment may have the following configurations.

The configuration of the lens barrel 120 has been merely set forth as one example, and the lens barrel 120 may have a different configuration. For example, in the foregoing embodiment, contact between the gear part 33 provided in the cam frame 3 and the FPC board 170 is reduced or prevented, and the gear part 33 prevented from contacting the FPC board 170 may be a gear part provided in a rotary frame other than the cam frame 3.

The first protrusion 45 is provided in the second-group translational frame 4, but may be provided in a frame body other than the first protrusion 45. Moreover, the second protrusion 22 is provided in the first-group translational frame 2, but may be provided in a frame body other than the second protrusion 22. In addition, either of the first protrusion 45 or the second protrusion 22 may be omitted.

The second-group translational frame 4 in which the first protrusion 45 is provided moves in the optical axis direction together with the cam frame 3. Moreover, the first-group translational frame 2 in which the second protrusion 22 is provided also moves in the optical axis direction together with the cam frame 3. That is, the positional relationship between each of the first protrusion 45 and the second protrusion 22 and the gear part 33 in the optical axis direction is not changed. However, the second-group translational frame 4 or the first-group translational frame 2 may be configured to move in the optical axis direction separately from the cam frame 3. In such a case, when the FPC board 170 is highly likely to contact the gear part 33, e.g., when the lens barrel 120 transitions between the wide-angle end in the shooting state and the collapsed state, the first protrusion 45 or the second protrusion 22 may be positioned right in front or back of the gear part 33.

The electronic component connected to the FPC board 170 is not limited to the shutter unit 6. For example, the electronic component connected to the FPC board 170 may be the drive mechanism of the blur correction frame 5.

The housing groove 76 of the fixed frame 7 does not necessarily cross the first cam groove 74. For example, in the case where there is a space at the inner circumferential surface of the fixed frame 7, the housing groove 76 may be formed in such a position that the housing groove 76 does not cross the first cam groove 74. Moreover, in the case where a decrease in size of the lens barrel 120 is not required, the housing groove 76 may be omitted, thereby increasing the dimension of the fixed frame 7 in the radial direction.

As described above, the techniques disclosed herein are useful for the lens barrel including the flexible printed circuit board.

What is claimed is:
1. A lens barrel, comprising:
a fixed frame having an optical axis;
a rotary frame provided inside the fixed frame and configured to rotate about the optical axis relative to the fixed frame;
a first frame provided inside the rotary frame and configured to move in an optical axis direction in a state in which rotation of the first frame about the optical axis relative to the fixed frame is restricted;
an electronic component provided inside the first frame and configured to move in the optical axis direction in a state in which rotation of the electronic component about the optical axis relative to the fixed frame is restricted; and
a flexible printed circuit board connected, at one end thereof, to the electronic component so as to extend to the fixed frame by way of a side of the rotary frame opposite to an object in the optical axis direction, and connected, at the other end thereof, to the fixed frame,
wherein a gear part is provided at an outer circumferential surface of the rotary frame, and
in the first frame, a first protrusion outwardly protruding beyond the gear part in a radial direction about the optical axis is provided at a position corresponding to the flexible printed circuit board in a circumferential direction about the optical axis on a side of the gear part opposite to the object in the optical axis direction.

2. The lens barrel of claim 1, further comprising:
a second frame provided inside the fixed frame and outside the rotary frame and configured to move in the optical axis direction in a state in which rotation of the second frame about the optical axis relative to the fixed frame is restricted,
wherein, in the second frame, a second protrusion outwardly protruding beyond the gear part in the radial direction about the optical axis is provided at a position corresponding to the flexible printed circuit board in the circumferential direction about the optical axis on a side of the gear part close to the object in the optical axis direction.

3. The lens barrel of claim 1, wherein
a cam pin is provided at the outer circumferential surface of the rotary frame, and
a cam groove engaged with the cam pin and an accommodation groove which crosses the cam groove and through which the first protrusion passes when the first frame moves relative to the fixed frame in the optical axis direction are formed at an inner circumferential surface of the fixed frame.

* * * * *